Patented June 5, 1928.

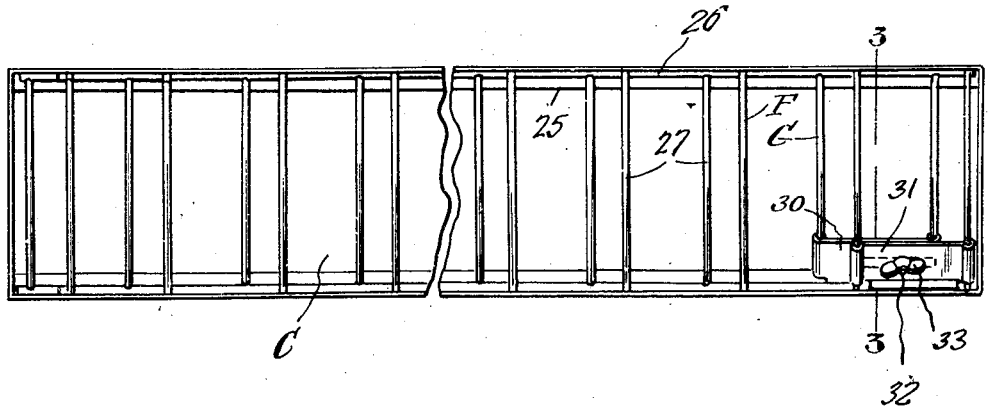
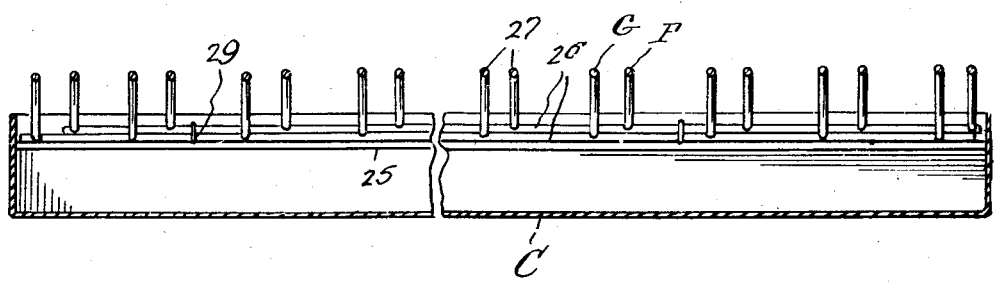
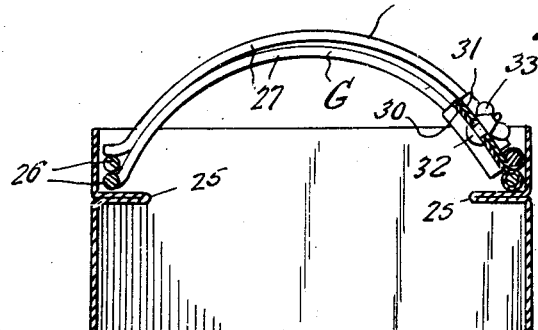

1,672,043

UNITED STATES PATENT OFFICE.

EDWARD SEIKMAN, OF CHIKASKIA TOWNSHIP, KINGMAN COUNTY, KANSAS.

POULTRY FEEDER.

Application filed May 17, 1926. Serial No. 109,615.

The present invention relates generally to a poultry feeder, and more particularly, to a feeder for young chicks.

An important object of the invention lies in the provision of a feeder of this nature which has adjustable members associated therewith for preventing larger chickens from feeding therefrom, the device being adjusted for the purpose of taking care of the growth of the young chicks.

Another very important object of the invention resides in the provision of a device of this nature having such a construction as prevents chickens from roosting thereon.

A still further very important object of the invention lies in the provision of a feeder of this nature which thoroughly is accessible, compact, convenient, simple in its construction, strong and durable, efficient and reliable, inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Fig. 1 is an elevation of an embodiment of the invention,

Fig. 2 is a longitudinal vertical section therethrough, and

Fig. 3 is a transverse section taken therethrough substantially on the line 3—3 of Fig. 1.

Referring to the drawing in detail, it will be seen that I provide a rectangular pan having an open top, said pan being designated generally by the letter C. The side walls of this pan C are provided adjacent their upper edges with inwardly projecting ledges 25, formed in any predetermined or preferred manner. A cage top is provided for the pan C and includes an outer or upper skeleton frame structure F and an inner or lower skeleton frame structure G. These skeleton frame structures F and G are practically of identical construction, each including a pair of longitudinally extending parallel spaced bars 26 and a plurality of transverse arcuate rods 27. Bars 26 of the frame G preferably rest on the ledges 25, while the bars 26 of the frame F rest on the bars 26 of the frame G. These bars and rods are preferably constructed of wire or in any other preferred manner.

Wire bands 29 are disposed about the bars 26 of the two frames, allowing these bars to slide in relation to each other. A slotted plate 30 is secured to two adjacent rods 27 of the frame G, and to one of its bars 26, while a plate 31 is secured to two adjacent rods 27 of the frame F and one of its bars 26. A bolt 32 pierces the slot of the plate 30 and an opening in the plate 31 and has a wing nut 33 thereon. Obviously, by loosening the nut 33, the skeleton frame F may be adjusted in relation to the frame G for spacing the rods of one frame from the rods of the other frame as may be desired.

The embodiment of the invention just described, is designed as a baby chick feeder for mash or dry feed. It preferably sits on the floor and while there, affords ready access to the feed for the chicks, and at the same time prevents the chicks from sitting or roosting on the cage construction thereof because of the arcuate formation of the rods. The edges prevent the chicks from pulling or dragging any of the feed out of the feeder.

It is to be noted that in my device, the structure enables the light to pass freely through the top by affording an abundance of light on the feed even though there may be many chicks feeding at one time, as is possible with my improved feeder. It is also to be noted that this feeder is not necessarily limited to the use described, but is generally applicable to poultry feeding.

It is thought that the construction, utility, and advantages of my invention will now be clearly understood by those skilled in this art without a more detailed description thereof. The present embodiment of the invention has been disclosed merely by way of example, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

A feeding device of the class described including, in combination, a container having its side walls provided with inwardly disposed ledges, an outer and an inner cage structure, the former above the latter, and each including a pair of longitudinally extending bars, the bars of the inner cage structure resting on the ledges and the bars of the outer cage structure resting on the bars of the inner cage structure.

In testimony whereof I affix my signature.

EDWARD SEIKMAN.